United States Patent [19]

Meier

[11] Patent Number: 4,519,179

[45] Date of Patent: May 28, 1985

[54] APPARATUS FOR ALIGNING AND BOXING FLAT ANGULAR ITEMS

[75] Inventor: Siegfried Meier, Neuhausen am Rheinfall, Switzerland

[73] Assignee: SIG - Schweizerische Industrie-Gesellschaft, Neuhausen am Rheinfall, Switzerland

[21] Appl. No.: 433,032

[22] Filed: Oct. 6, 1982

[30] Foreign Application Priority Data

Nov. 6, 1981 [CH] Switzerland .................. 7124/81

[51] Int. Cl.$^3$ ............................................. B65B 19/34
[52] U.S. Cl. .................................... 53/236; 53/525; 53/148; 193/2 B; 193/46
[58] Field of Search ............... 53/525, 236, 148, 247, 53/244; 193/2 B, 46, 44, 30

[56] References Cited

U.S. PATENT DOCUMENTS

| | | | |
|---|---|---|---|
| 1,893,903 | 1/1933 | Mullins | 193/2 B |
| 2,236,890 | 4/1941 | Bower et al. | 53/525 |
| 2,250,427 | 7/1941 | Vannucci | 193/46 |
| 2,632,588 | 3/1953 | Hoar, Jr. | 53/525 X |
| 2,745,232 | 5/1956 | Alfandre et al. | 53/525 |
| 3,084,783 | 4/1963 | Morton et al. | |
| 3,267,641 | 8/1966 | Molins | 53/236 X |

FOREIGN PATENT DOCUMENTS 3004935  11/1980  Fed. Rep. of Germany .

Primary Examiner—Horace M. Culver
Attorney, Agent, or Firm—Spencer & Frank

[57] ABSTRACT

An apparatus for filling packaging boxes with flat, angular articles, includes an intermediate container accommodating the articles in a random pile; a charging hopper introducing the articles into the packaging boxes; and a conveying arrangement delivering the articles from the intermediate container into the charging hopper. The conveying arrangement has a first aligner including a plurality of serially arranged troughs each having side walls and a bottom wall defining a channel. The channels formed in the troughs are serially connected to form a continuous conveying track having an outlet end. The channels include an aligning arrangement for turning the articles, advancing thereon in a flow, into an at least approximately parallel orientation by the time they arrive to the outlet end of the conveying track. The conveying arrangement further has a second aligner including a rotary transfer wheel situated between the outlet end of the conveying track and the discharge hopper for conveying articles in an at least approximately parallel orientation to one another from the outlet end of the conveying track to the charging hopper.

10 Claims, 4 Drawing Figures

U.S. Patent May 28, 1985 4,519,179
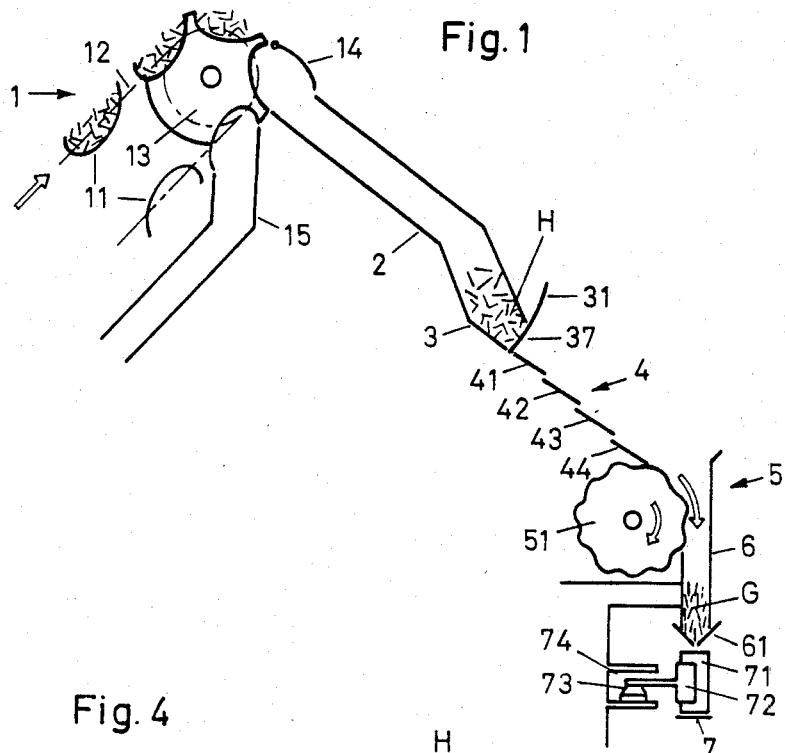
Fig. 1
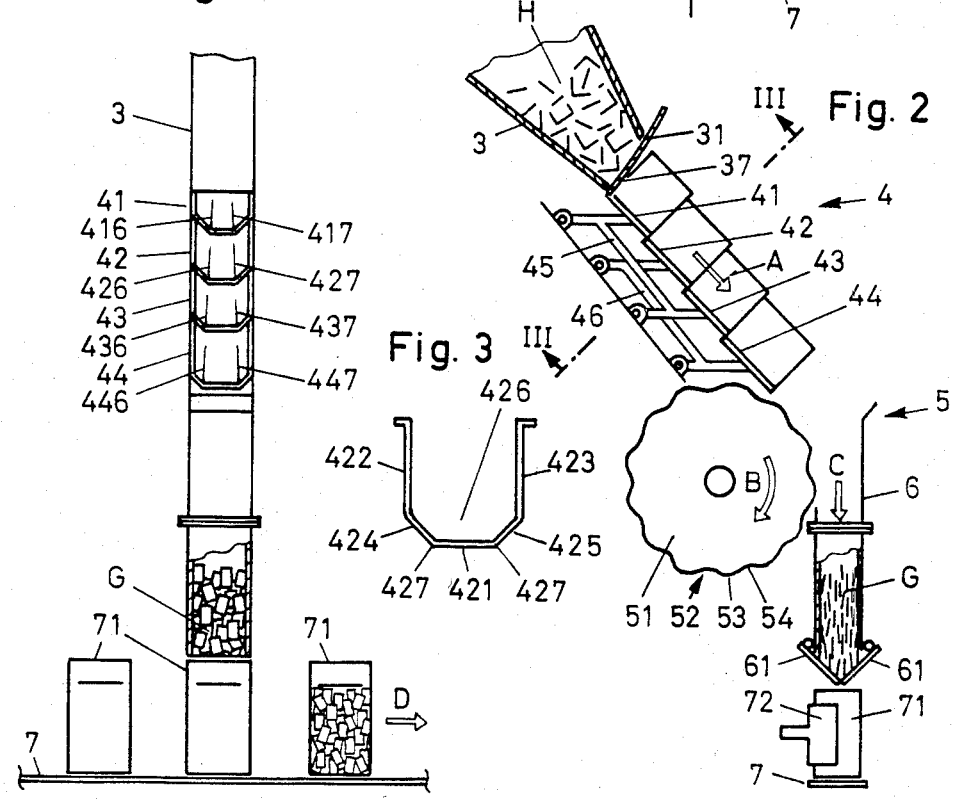
Fig. 4
Fig. 2
Fig. 3

APPARATUS FOR ALIGNING AND BOXING FLAT ANGULAR ITEMS

BACKGROUND OF THE INVENTION

This invention relates to an apparatus for aligning flat, angular articles such as baked goods and for filling a container (packaging box) with such articles. The apparatus comprises an intermediate container in which the articles are held in readiness in a random pile for discharge through a closable outlet opening provided in the intermediate container. The apparatus further has a conveyor arrangement provided with aligning devices as well as a charging hopper which has a closable discharge opening and which serves for releasing quantities of articles into the packaging box.

It is known to fill packaging boxes in a random manner with baked goods and other foodstuff of varying shape. Such baked goods may be, for example, hexagonal crackers or rectangular Triscuits. A random filling (pouring) of baked goods into packaging boxes has the disadvantage that unoccupied spaces result, whereby the utilization of the available box space is incomplete and consequently the packaging machines operate with a reduced efficiency.

On the other hand, however, a pouring of the baked goods facilitates the metering thereof, because a high degree of weight accuracy can be achieved with relatively small structural input.

In the packaging industry machines are further known which stack flat articles such as biscuits in an aligned manner and packages them in counted quantities. Thus, U.S. Pat. No. 3,084,783 discloses an apparatus in which flat-lying circular articles are, on a conveyor belt, gathered into channels and introduced into a collector by means of drums having a stepped circumferential surface. In each stepped part there is accommodated an article and, dependent upon the height at which a remover for the collector is arranged, the articles may be further conveyed in a flat-lying or edgewise standing orientation.

Heretofore no apparatus has been known with which flat articles conveyed in a random pile are aligned at least to a certain degree for depositing them in a packaging box in their aligned state.

SUMMARY OF THE INVENTION

It is an object of the invention to provide an improved apparatus of the above-outlined type by means of which articles delivered thereto in a random pile are, without substantial structural input, aligned at least to such an extent that the articles are arranged in the packaging box in layers so that no otherwise avoidable unfilled spaces remain therein, whereby the available box volume is better utilized than heretofore.

This object and others to become apparent as the specification progresses, are accomplished by the invention, according to which, briefly stated, the apparatus for filling packaging boxes with flat, angular articles, includes an intermediate container accommodating the articles in a random pile; a charging hopper introducing the articles into the packaging boxes; and a conveying arrangement delivering the articles from the intermediate container into the charging hopper. The conveying arrangement has a first aligner including a plurality of serially arranged troughs each having side walls and a bottom wall defining a channel. The channels formed in the troughs are serially connected to form a continuous conveying track having an outlet end. The channels include an aligning arrangement for turning the articles, advancing thereon in a flow, into an at least approximately parallel orientation by the time they arrive to the outlet end of the conveying track. The conveying arrangement further has a second aligner including a rotary transfer wheel situated between the outlet end of the conveying track and the discharge hopper for conveying articles in an at least approximately parallel orientation to one another from the outlet end of the conveying track to the charging hopper.

BRIEF DESCRIPTION OF THE DRAWING

FIG. 1 is a schematic side elevational view of a preferred embodiment of the invention.

FIG. 2 is a schematic side elevational view of an enlarged detail of FIG. 1.

FIG. 3 is a sectional view of a component taken along line III—III of FIG. 2.

FIG. 4 is a schematic front elevational view of the structure shown in FIG. 2.

DESCRIPTION OF THE PREFERRED EMBODIMENT

Turning now to FIG. 1, the apparatus shown therein comprises a conventional bucket conveyor 1 including conveyor buckets 11, connected to one another by a conveyor chain 12 supported by an upper end sprocket 13. At the discharge end of the bucket conveyor 1 (adjacent the sprocket 13) there is disposed a pivotal gate 14 and from the sprocket 13 there extends a return track 15. All these components form part of a conventional article weighing and supplying arrangement, whose further details have no bearing on the invention, and are therefore not described or illustrated.

The gate 14 may be actuated as a function of the filled state of an intermediate container 3 coupled with the outlet of the bucket conveyor 1 by means of a slide 2. The control of the gate 14 is so effected that in case the intermediate container 3 is not emptied, the gate 14 remains in a closed position (shown in broken lines) and the articles are returned towards the input of the bucket conveyor 1 by means of the return track (slide) 15.

In the open state of the gate 14 (shown in solid line) the articles are introduced through the slide 2 in a random state into the intermediate container 3 and form therein a random pile H. The intermediate container 3 has a discharge opening 37 provided with a sliding closure 31.

As viewed in the direction of article advance, downstream of the intermediate container 3 there are provided two article advancing arrangements formed of first and second aligners 4 and 5 which together constitute a downwardly sloping conveying path.

The first aligner 4 is formed of a plurality (for example, four) channels 41, 42, 43 and 44 which are pairwise coupled with two vibratory drives 45 and 46 and are partially nested in one another. The second aligner 5 is constituted by a transfer wheel 51 whose circumferential surface 52 is undulating and thus forms alternating peaks 53 and depressions 54. The transfer wheel 51 is driven clockwise as indicated by the arrow B in the conveying direction by means of a drive (not shown). The transfer wheel 51 receives the articles at the downstream end of the first aligner 4 and after a turn of approximately 90° drops the articles into a charging hopper 6 where the articles G are collected in a generally vertical orientation. The hopper 6 is provided with closure flaps 61 which may be operatively coupled with a conveyor chain 7 on which packaging boxes 71 are advanced in series. The conveyor chain 7 has cradle-like members 72 for supporting the packaging boxes 71 and roller components 73 arranged in a guide track 74. This conveying arrangement for the boxes 71 is conventional and does not form an integral part of the invention and is therefore not described or illustrated in further detail.

The first aligner 4 will be described in further detail with reference to FIGS. 2, 3 and 4.

The first aligner 4 is formed, as noted earlier, of four channels 41, 42, 43 and 44 which are slightly overlapping in a downward direction so as to form a stacked arrangement as particularly well seen in FIG. 2.

The channels 41–44 are formed by troughs of U-shaped cross section as shown in FIG. 3 for the channel 42. The latter and all the other channels 41, 43 and 44 have opposite vertical side walls 422, 423 and a bottom wall 421. Between the bottom wall 421 and the two side walls 422, 423, there are provided oblique transitional walls 424 and 425 whereby a deepened base 426 is formed in the channel.

The transitional walls 424 and 425 form with the bottom wall 421 two guide edges 427 which diverge in the direction of conveyance. As illustrated in FIG. 4, similar guide edges 417, 437 and 447 are formed in the respective channels 41, 43 and 44 as well. The distances between the guide edges 417, 427, 437 and 447 are identical at the transitional locations in the adjoining channels so that these serially arranged guide edges together form two straight lines which are divergent in the direction of article advance.

In operation the articles are conventionally placed in readiness in the intermediate container 3 as a random pile H. Upon opening the sliding gate 31 articles G are discharged from the pile H and arrive, by virtue of the inclination of the bottom 32 of the intermediate container 3 into the first channel 41. Due to the vibration of the channels 41, 42, 43, 44 by mechanisms 45 and 46 and due to the inclined bottom wall of each of the channels, the articles are conveyed in a flow downwardly as indicated by the arrow A. By means of vibration and the diverging guide edges, the articles gradually turn as they move downward on the aligner 4 and align themselves such that opposite article sides are parallel to the side walls of the channel. From the last channel 44 of the first aligner 4 the articles fall freely, with a small side leading, onto the transfer wheel 51 of the second aligner 5. As the wheel 51 rotates in the direction of the arrow B, the articles, seated in the depressions 54 of the transfer wheel 51, are conveyed in an arcuate path and then are dropped into the hopper 6 approximately in a vertical orientation.

It is seen that for equal speeds of the two conveying directions A and B the articles are dropped in the direction of the arrow C into the charging hopper 6 in the same mutual relationship as they were when conveyed by the first aligner 4. If, however, the circumferential speed of the transfer wheel 51 is lower than the conveying speed in the direction of the arrow A, the articles are "shingled" and thus almost ideally placed in a parallel orientation before reaching the hopper 6. After the articles of the entire pile H have been transported into the hopper 6 as described above, the gates 61 thereof are opened and the box 71 aligned with the hopper 6 is filled. During this occurrence, the articles G drop in a mutually parallel and overlapping orientation into the box 71 so that no unutilized space will remain in the box 71.

The conveyor chain 7 moves the filled box 71 away from the charging hopper 6 and places a new, empty box 71 thereunder. It is to be understood that the motion of the bucket conveyer 1, the sliding gate 31 of the intermediate container 3 as well as the gates 61 of the filling hopper 6 may be synchronized with one another in a conventional manner.

It will be understood that the above description of the present invention is susceptible to various modifications, changes and adaptations, and the same are intended to be comprehended within the meaning and range of equivalents of the appended claims.

What is claimed is:

1. In an apparatus for filling packaging boxes with flat, angular articles, including an intermediate container accommodating the articles in a random pile; a charging hopper introducing the articles into the packaging boxes; and conveying means delivering the articles from said intermediate container into said charging hopper; the improvement in said conveying means comprising
    (a) a first aligner including a plurality of serially arranged single troughs each having side walls and a bottom wall defining a channel; the channels formed in said troughs being serially connected to form a sole continuous conveying track having an outlet end; said channels including aligning means for turning the articles, advancing thereon in a flow, into an at least approximately parallel orientation by the time they arrive to said outlet end of said conveying track; and
    (b) a second aligner including a rotary transfer wheel situated between said outlet end of said conveying track and said discharge hopper for conveying articles in an at least approximately parallel orientation to one another from said outlet end of said conveying track to said charging hopper.

2. An apparatus as defined in claim 1, wherein said transfer wheel comprises an article-receiving peripheral face wavy formed of a plurality of circumferentially alternating peaks and depressions.

3. An apparatus as defined in claim 1, further comprising means for vibrating at least one of said troughs.

4. An apparatus as defined in claim 1, wherein said aligning means of said channels comprise two cooperating guide edges formed in each said trough between said bottom wall and respective said side walls; in each said trough said guide edges being inclined downwardly and being divergent in the direction of article advance.

5. An apparatus as defined in claim 4, wherein the guide edges in said troughs are arranged in alignment throughout said conveying track for forming two continuous, downwardly oriented and divergent guide edges along said conveying track.

6. An apparatus as defined in claim 1, wherein the number of said troughs is at least four; further comprising vibratory drive means; said troughs being connected in pairs to said vibratory drive means.

7. An apparatus as defined in claim 6, wherein said vibratory drive means comprise at least two vibratory drives partially nested in one another.

8. An apparatus as defined in claim 1, wherein said conveying track is inclined downwardly in the direction of article advance.

9. An apparatus as defined in claim 8, wherein said transfer wheel is situated underneath said outlet end of said conveying track.

10. An apparatus as defined in claim 8, wherein adjoining said troughs are partially nested in one another.

* * * * *